Patented July 29, 1941

2,250,962

UNITED STATES PATENT OFFICE 2,250,962

PREGNANDIOLS AND METHOD OF OBTAINING THEM

Russell Earl Marker, State College, Pa., assignor to Parke, Davis & Company, Detroit, Mich., a corporation of Michigan No Drawing. Original application November 5, 1937, Serial No. 173,044. Divided and this application March 13, 1939, Serial No. 261,661

10 Claims. (Cl. 260—397.5)

The invention relates to new dihydroxy compounds having the pregnane structure and methods for their preparation.

This application is a division of my copending application, Serial No. 173,044, filed November 5, 1937.

The invention refers more particularly to pregnane derivatives of formula $C_{21}H_{34}(OH)_2$ forming insoluble digitonides and having hydroxyl groups at $C_3$ and $C_{20}$ in trans-steric arrangement with each other.

On the basis of isomerism due to asymmetry at carbon-atoms 3, 5 and 20 of the pregnane structure,

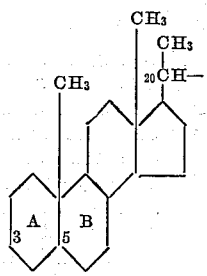

Pregnane structure (present in normal pregnane and in allo-pregnane compounds)

there are eight possible pregnandiol-3,20 compounds. Six of these have previously been described.

In this application the prefixes $\alpha$ and $\beta$ are used to distinguish between the isomeric hydroxyl groups at $C_{20}$. $\alpha$ designates the configuration of both OH groups found in natural pregnandiol and allo-pregnandiol which have previously been isolated from pregnancy urine. $\beta$ signifies the epimers. According to this terminology, natural pregnandiol is referred to as pregnandiol $3\alpha,20\alpha$ and the two new compounds of this invention are pregnandiol $3\beta,20\alpha$ and allo-pregnandiol-$3\beta,20\alpha$. (See Journal of American Chemical Society 59, 2291 (1937).)

It has now been found that the other two, pregnandiol-$3\beta,20\alpha$ and allo-pregnandiol-$3\beta,20\alpha$ having the formulas,

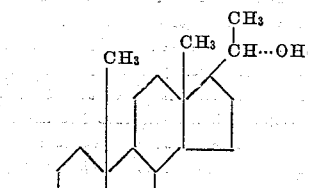

Pregnandiol-$3\beta$, $20\alpha$

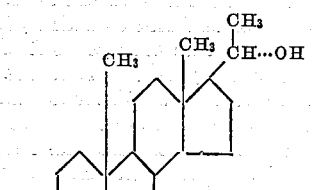

Allo-pregnandiol-$3\beta$, $20\alpha$ can be made by a new general process described herein for producing isomeric 3,20-hydroxy compounds of the pregnane series. By 3,20-dihydroxy compounds of the pregnane series it is intended to include not only the normal pregnane derivatives having a cis-steric arrangement between rings A and B but also the allo-pregnane derivatives isomeric therewith due to asymmetry at carbon-atom 5 of the pregnane nucleus.

The process of the present application is based upon my discovery that the new 3,20-dihydroxy pregnane compounds of the invention having hydroxyl groups at $C_3$ and $C_{20}$ in trans-steric arrangement with each other may be made by catalytic hydrogenation in acid solution of the corresponding ol-20-one-3 compounds or their hydrolyzable derivatives where the $C_{20}$-hydroxyl group is replaced by a group hydrolyzable to give a $C_{20}$-hydroxyl group.

The invention may be illustrated by the following examples:

EXAMPLE 1.—*Preparation of pregnandiol-3β,20α from pregnanol-20α-one-3-acetate*

The acetate of pregnanol-20α-one-3 can be made by any known method. However, in this example the following procedure was used. Ten grams of pregnandiol-3α, 20α diacetate melting at 178° C. is dissolved in 3100 cc. of methyl alcohol at 20° C. To this solution there is added a solution of 1.13 grams of potassium hydroxide dissolved in 190 cc. of methyl alcohol. The mixed solutions are allowed to stand at 20° C. for 48 hours and then carefully neutralized with sulfuric acid. The methyl alcohol is distilled off from the reactants. The residue consists largely of pregnandiol-3α,20α-monoacetate-20. It is dissolved in 250 cc. of acetic acid at 20° C. and a solution of 1.5 grams of chromic oxide in 50 cc. of 90% acetic acid is added. After standing for 18 hours the solution is diluted with water and the precipitate obtained upon adding the water is filtered off. It is crude pregnanol-20α-one-3 acetate. It is purified by dissolving in 100 cc. of alcohol and heating for 15 minutes with 6 grams of Girard's reagent (trimethylaminoacetohydrazide hydrochloride). The solution is then poured into water and extracted with ether, the aqueous layer separated and acidified with hydrochloric acid and finally heated to 80° C. for 16 minutes, after which it is extracted with ether, the ether evaporated and the remaining purified pregnanol-20α-one-3 acetate taken up in alcohol and crystallized therefrom to give crystals melting at 144.5° C.

Two grams of the purified pregnanol-20α-one-3 acetate is dissolved in 100 cc. of acetic acid containing 1 cc. of hydrobromic acid and the whole added to a suspension of 1.0 gram of previously reduced platinum oxide in acetic acid. The mixture is shaken for 80 minutes with hydrogen at 45 pounds pressure. The catalyst is filtered off and the acetic acid evaporated from the filtrate to give a volume of 25 cc. Water is added and the product extracted with ether. The ether is evaporated from the extract and the residue is dissolved in 50 cc. of alcohol. The alcoholic solution is added to a hot solution of 8 grams of digitonin in 400 cc. of alcohol. After standing overnight, the insoluble digitonide of pregnandiol-3β,20α-monoacetate-20 which separates out is filtered off and washed with alcohol. The digitonide is heated with pyridine on a steam bath for 15 minutes, after which the solution is poured into 800 cc. of ether and filtered. The ethereal filtrate is washed with dilute hydrochloric acid and then the ether is evaporated. The residue from evaporating off the ether is pure pregnandiol-3β,20α-monoacetate-20 and can be taken up and crystallized from alcohol to give crystals melting at 147.5° C.

Anal. calc. for $C_{23}H_{38}O_3$: C, 76.2; H, 10.6. Found: C, 76.1; H, 10.7.

240 mg. of pure pregnandiol-3β,20α-monoacetate-20 is dissolved in 50 cc. of alcohol and to this solution there is added 0.5 gram of sodium hydroxide dissolved in 2 cc. of water. The solution is heated for an hour, neutralized with hydrochloric acid and the pregnandiol-3β,20α precipitated by the addition of water. It is filtered off and crystallized from alcohol to give crystals of pure pregnandiol-3β,20α melting at 182° C.

Anal. calc. for $C_{21}H_{36}O_2$: C, 78.7; H, 11.3. Found: C, 78.9; H, 11.5.

*Diacetate of pregnandiol-3β,20α*

A solution of 115 mg. of pregnandiol-3β,20α-monoacetate-20 in 3 cc. of acetic anhydride is refluxed for one hour. The reaction mixture is then taken up in alcohol and crystallized therefrom to give the diacetate of pregnandiol-3β,20α melting at 141° C.

Anal. calc. for $C_{25}H_{40}O_4$: C, 74.2; H, 10.0. Found: C, 74.8; H, 10.2.

Instead of reducing the acetate of pregnanol-20α-one-3 in the above example, any other ester or hydrolyzable derivative of pregnanol-20α-one-3 can be reduced in acid solution as described and then hydrolyzed.

The pregnandiol-3β-20α obtained by this example can be converted by the ordinary methods of making derivatives of alcohols into its chloride, bromide, or other hydrolyzable derivative where one or both of the $C_3$ and $C_{20}$ hydroxyl groups is replaced by a group capable of hydrolysis to give a hydroxyl radical. Hence, the general formula for the new compounds of the invention, as illustrated by this example, is as follows;

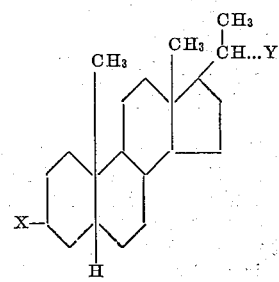

where X and Y represent the same or different members of the group comprising a hydroxyl radical or equivalent hydrolyzable group capable of yielding a hydroxyl group.

EXAMPLE 2.—*Preparation of allo-pregnandiol-3β, 20α from allo-pregnanol-20α-one-3*

1.0 gram of allo-pregnanol-20α-one-3 mixed with 0.5 gram of platinum oxide in 150 cc. of acetic acid is shaken for an hour at 30° C. with hydrogen at 3 atmospheres pressure. The solution is then filtered to remove the catalyst and the filtrate diluted with ½ liter of water and extracted with ether. The ether extract is separated, washed with water and dilute sodium carbonate and then evaporated to dryness to give a 3,20-dihydroxy pregnane residue. This residue is dissolved in 50 cc. of alcohol and poured into a solution of 300 cc. of ethyl alcohol containing 4 grams of digitonin. After 12 hours the precipitated digitonide of allo-pregnandiol-3β,20α is filtered off and dried. It is then heated on a steam bath for 15 minutes with 10 cc. of dry pyridine and the resulting solution poured into 250 cc. of ether. After standing for 30 minutes, the solution is filtered and the filtrate poured into 500 cc. of dilute hydrochloric acid. The ethereal layer is separated, washed with water and evaporated to dryness. The residue thus obtained is taken up in ethyl alcohol and crystallized therefrom to give 0.3 gram of crystals of allo-pregnandiol-3β, 20α melting at 218° C. The crystals occur in the form of platelets.

Anal. calc. for $C_{21}H_{36}O_2$: C, 78.8; H, 11.3. Found: C, 79.2; H, 11.5.

The allo-pregnandiol-3β,20α can be converted by the ordinary methods of making derivatives of alcohols into its mono- and di-esters, chlorides, bromides, or other hydrolyzable derivatives where one or both of the hydroxyl groups are replaced by a group capable of hydrolysis to again give a hydroxyl radical. For example, the allo-pregnandiol-3β,20α can be partially esterified to give its mono-ester or both hydroxyl groups can be esterified and the resulting di-ester partially saponified to give a mono-ester.

Diacetate of allo-pregnandiol-3β,20α

A solution of 100 mg. of allo-pregnandiol-3β,20α dissolved in 10 cc. of acetic anhydride is refluxed for 30 minutes, the reaction product evaporated to dryness in vacuo and the residue crystallized from dilute acetone to give large angular plates of allo-pregnandiol-3β,20α-diacetate melting at 168° C.

Anal. calc. for $C_{25}H_{40}O_4$: C, 74.4; H, 10.0. Found: C, 74.5; H, 10.1.

In making allo-pregnandiol-3β,20α by the above example, it is possible to reduce the monoacetate of allo-pregnanol-20α-one-3 and separate out the allo-pregnandiol-3β,20α-monoacetate obtained. The monoacetate can then be hydrolyzed to give allo-pregnandiol-3β,20α.

The allo-pregnandiol-3β,20α obtained by this example can be converted by the ordinary methods of making derivatives of alcohols into its chloride, bromide, or other hydrolyzable derivative where one or both of the $C_3$ and $C_{20}$ hydroxyl groups is replaced by a group capable of hydrolysis to give a hydroxyl radical. The general formula for the new compounds of the invention, as illustrated by this example, is as follows:

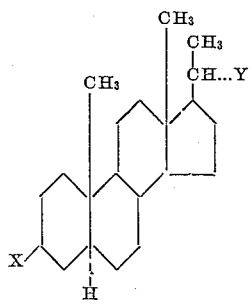

where X and Y represent the same or different members of the group comprising a hydroxyl radical or equivalent hydrolyzable group capable of yielding a hydroxyl radical.

In my application, Serial No. 173,044, above referred to, I have described and claimed a process in which certain compounds of this invention are obtained by isomerization at $C_3$ to produce the trans-steric arrangement without simultaneous steric inversion of the $C_{20}$-hydroxyl group. I have also claimed in said application the new allo-pregnandiol compounds of the invention.

What I claim as my invention is:

1. Process for the preparation of a 3,20-dihydroxy pregnane compound precipitable by digitonin, and having the 3-hydroxyl and the 20-hydroxyl groups in trans-steric arrangement, which comprises catalytically hydrogenating the corresponding ol-20-one-3 compound in acid solution.

2. Process for the preparation of a 3,20-dihydroxy pregnane compound precipitable by digitonin, and having the 3-hydroxyl and the 20-hydroxyl groups in trans-steric arrangement, which comprises hydrogenating the corresponding ol-20-one-3 compound in acid solution and in presence of a platinum catalyst.

3. Process for the preparation of an allo-pregnandiol-3β,20α compound which comprises catalytically hydrogenating in acid solution an allo-pregnanol-20α-one-3 compound of formula,

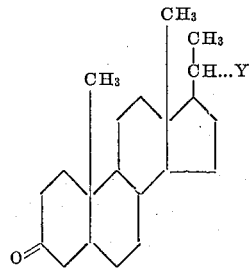

where Y is a member of the class hydroxyl and a group capable of hydrolysis to give hydroxyl.

4. Process for the preparation of a pregnandiol-3β,20α compound which comprises catalytically hydrogenating in acid solution a pregnanol-20α-one-3 compound of formula,

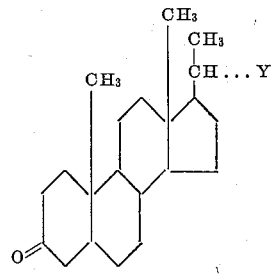

where Y is a member of the class hydroxyl and a group capable of hydrolysis to give hydroxyl.

5. Process for the preparation of allo-pregnandiol-3β,20α which comprises catalytically hydrogenating allo-pregnanol-20α-one-3.

6. Process for the preparation of pregnandiol-3β,20α which comprises catalytically hydrogenating in acid solution pregnanol-20α-one-3 acetate to obtain the acetate of pregnandiol-3β,20α, and hydrolyzing the latter compound to obtain pregnandiol-3β,20α.

7. Pregnandiol-3β,20α having a melting point of approximately 182° C.

8. Pregnandiol-3β,20α-monoacetate-20 having a melting point of approximately 147.5° C.

9. Pregnandiol-3β,20α-diacetate having a melting point of approximately 141° C.

10. Compounds of the pregnane series of formula,

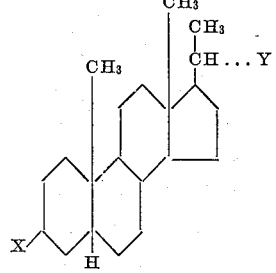

where X and Y are members of the class, hydroxyl and a group capable of hydrolysis to give hydroxyl.

RUSSELL EARL MARKER.